Patented Jan. 4, 1949

2,457,971

UNITED STATES PATENT OFFICE 2,457,971

SILICA SOL

Vanderveer Voorhees, Homewood, Ill., assignor to Standard Oil Company, Chicago, Ill., a corporation of Indiana No Drawing. Application November 29, 1945, Serial No. 631,768

5 Claims. (Cl. 252—313)

This invention relates to silicic acid sol and more particularly to a method of preparing silicic acid sol substantially free of alkali metals and other nonvolatile contaminants. An object of the invention is to provide silicic acid or silica sol in a relatively concentrated solution suitable for use as a coagulant, for the preparation of silica gel and for other purposes where alkali metal salts or other nonvolatile contaminants would be objectionable.

A specific object of the invention is to provide a method of making alkali metal-free silica sol suitable for preparing catalysts by gelling and drying where the presence of even small amounts of alkali metal of the order of 0.1 to 0.5 per cent is harmful to the activity and life of the catalyst. Such catalysts are typified by alumina-silica and magnesia-silica as employed in the conversion of hydrocarbons at conversion temperature.

In the clarification of pharmaceutical products, it is also important to avoid contamination by alkali metals which usually accompany silica sol made from alkali metal silicates.

It has heretofore been known to prepare silica sols substantially free of alkali metals by the slow and expensive process of dialysis. Attempts have also been made to prepare silica sol from sodium silicate solutions by contact with ion-exchange resins having the property of substituting hydrogen ion for alkali metal ion. In this process, however, it has been necessary to operate with relatively dilute solutions of sodium silicate or other alkali metal silicate, or to retain in the treated solution a small amount of the alkali metal salt, e. g. sodium hydroxide, as a stabilizer for the silicic acid solution. In operating with solutions of substantially higher concentration than 5% or when attempting to carry out the exchange reaction to a point where substantially all alkali metal ion is removed, it has been found that the silicic acid coagulates in the ion-exchange resin with the result that substantially no silicic acid sol is obtainable.

I have now discovered that silica sol of substantial concentration may be prepared by contacting an alkali metal silicate solution with an ammonium ion exchanger and particularly with an ammonium ion-exchange resin. For this purpose I prefer to use synthetic resins having a high absorptivity coefficient for alkali metal ions and regenerable by acid or by ammonium salt. Resins of this type are described by R. J. Meyers et al. in Industrial and Engineering Chemistry, vol. 33 (1941), page 697. They may be made by treatment of carbonaceous material such as coal but the preferred resins are of the type designated as "Amberlites" which are produced by the reaction of phenols with formaldehyde. "Zeo-Karb" is another ion-exchange resin produced from the treatment of coal, lignite, etc., with acids. These resins are generally referred to as "cation-exchange resins."

In carrying out the process, I prefer to employ the exchanger in a granular bed and pass a solution of sodium silicate thru it. For this purpose I may employ sodium silicate of about 10 to about 30 per cent, preferably about 10 to 15 per cent $SiO_2$ concentration. This may be prepared by dilution of N-brand water glass. Room temperature or most any temperature between about 32 and 150° F. may be used. The resulting sol, substantially free of alkali metal, can be concentrated by evaporation, if desired, provided sufficient ammonia concentration is retained to prevent coagulation. Concentration is not usually required, however, because quite high concentrations are obtainable directly from the ion exchanger.

After operating for a period of time the exchanger becomes ineffective for removing alkali metal ion and must be regenerated. This may be accomplished by first washing out the silicate solution with distilled water and then replacing the alkali metal ion from the exchanger by treatment with acid, for example, hydrochloric or sulfuric acid in dilute solution, e. g. 2 to 10 per cent, followed by distilled water again to remove excess acid. It is preferred to backwash with acid, i. e. cause the acid to flow thru the bed of exchanger in the opposite direction to that of the preceding flow of the silicate solution.

The hydrogen ion-exchange resin is next treated with ammonium hydroxide solution to replace the hydrogen ion with ammonium ion, after which the exchanger is ready for treatment of further quantities of silicate solution. The reactions involved may be represented as follows, the symbol R indicating the resin or exchanger molecule minus cation:

$NH_4R + NaOH \cdot (SiO_2)_x = NaR + NH_4OH \cdot (SiO_2)_x$ (operating)
$NaR + HCl = NaCl + HR$ (regenerating—1st step)
$HR + NH_4OH = NH_4R + H_2O$ (regenerating—2d step)

In the above equation the subscript $x$ is a small number of the order of 1 to 2 which varies with the composition of the water glass solution employed.

Instead of regenerating in two steps as just described, I may regenerate the cation-exchanger, in a single step, employing for the purpose an ammonium salt such as ammonium chloride or ammonium sulfate in aqueous solution, generally at least 10 per cent concentration and preferably approaching saturation. In this treatment the alkali metal ion is displaced from the exchanger by the ammonium ion and the excess ammonium salt is washed out with copious amounts of distilled water. Instead of distilled water we may of course employ ion-free water produced by successive treatment with cation and anion exchangers.

As an example, hydrogen ion exchange synthetic resin material known as Amberlite resin IR—1 was treated with ammonium hydroxide (11% $NH_3$) and washed with distilled water to remove excess ammonia. A silica solution containing 20 per cent $SiO_2$ and sodium hydroxide, pH 9.4, was passed thru the exchanger with a contact time of little more than one-half hour. The treated solution was quite stable, remaining limpid on standing a week, whereas when the pH was adjusted to 6 with HCl it set to a gel in a few hours. The silica gel resulting from coagulation of the sol with HCl will contain ammonium chloride which is readily volatilized from the dried gel on ignition, thus requiring no washing to remove salts.

If the ammonium exchanger-treated silicic acid sol is subjected to drying without any addition of acid for pH adjustment, it can be set to a gel which, on drying and/or igniting, will lose its ammonium hydroxide content and remain substantially pure $SiO_2$. In one experiment some of the treated solution was heated to 180° F. and blow with air, becoming slightly acid from loss of $NH_3$. One hour later the hot sol gelled. This demonstrates that the stabilizing $Na^+$ has been replaced by the volatile ammonia in the sol.

The alkali metal-free silica sol is convenient for the preparation of both lump and microspherical particles of silica gel for use as adsorptive agents, catalysts for hydrocarbon conversion, polymerization reactions, etc. Various promoters may be added to this silica gel prepared in this way such as chromium, molybdenum, nickel, copper, aluminum, magnesium, vanadium, etc. These promoters may be added to the sol before coagulation, by impregnation of the gel with suitable salts or by immersion of the gel in salt solutions and hydrolysis. Ammonium molybdate, for example, may be added to the treated, alkali metal-free sol before drying.

In place of the resin type ion exchangers, I may sometimes use the mineral exchangers exemplified by the zeolites and permutits. These cannot be regenerated with acid, however, and must be regenerated with ammonium salts, e. g. ammonium sulfate, chloride, etc.

In certain cases, particularly where high silica concentration is desired, I may conduct the dealkali ionizing operation in two or more stages. In the first stage the sodium silicate solution at a concentration of about 5 percent $SiO_2$ is partially dealkalized by contacting with a hydrogen ion-exchange resin, leaving sufficient sodium ion in the sol to stabilize it. This solution may then be evaporated, for example, to a silica concentration of 15 to 30 per cent $SiO_2$ without coagulation and contacted with an ammonium ion exchanger to replace the remaining alkali metal with ammonium ion giving an alkali metal-free silica sol in high concentration.

Having thus described my invention what I claim is:

1. The process of making substantially alkali metal-free silica sol from an alkali metal silicate solution which comprises adjusting the concentration of said solution to an $SiO_2$ content of between about 10 and about 30 per cent and contacting said solution with an ammonium ion exchanger by flowing said solution thru a mass of said exchanger in granular form.

2. The process of making a silica sol with a silica concentration between about 10 and about 30 per cent and substantially free of alkali metal which comprises contacting an alkali metal silicate solution containing between about 10 and about 30 per cent $SiO_2$ with a cation-exchange resin containing exchangeable ammonium ions by flowing said solution thru a mass of said exchanger in granular form.

3. The process of preparing a substantially alkali metal-free silica sol which comprises contacting an alkali metal silicate solution containing between about 10 and about 30 per cent $SiO_2$ with a mass of an ammonium ion-exchange material in porous granulated form by flowing said solution thru said mass until a substantial concentration of alkali metal has been accumulated in said mass, regenerating said material by contacting with an acid to replace the alkali metal ion with hydrogen ion, then contacting with ammonium hydroxide to replace the hydrogen ion with ammonium ion and employing the regenerated ion-exchange material for the treatment of additional alkali metal silicate solution.

4. The process of preparing a silica sol in a concentration of between about 10 and about 30 per cent $SiO_2$ but substantially free of alkali metal which comprises flowing an alkali metal silicate solution containing between about 10 and about 30 per cent $SiO_2$ thru a porous granulated mass of ammonium ion-exchange resin, continuing the treatment of the resin with the solution until the resin is substantially charged with alkali metal ions, regenerating the said resin by contacting with an acid to discharge alkali metal therefrom, then contacting with an ammonium salt solution to regenerate the ammonium ion-exchange resin in its original condition for reuse in the process and employing the regenerated ion-exchange resin for the treatment of additional alkali metal silicate solution.

5. The process of preparing a silica sol in high concentration substantially free of alkali metal salts which comprises contacting a dilute alkali metal silicate solution containing about 5 per cent $SiO_2$ with a hydrogen ion-exchange material, by flowing said solution thru a porous mass of said material, to replace a portion of the alkali metal ions in said solution with hydrogen ions, leaving a small part of said alkali metal to stabilize the resulting sol, concentrating the resulting silica sol containing residual alkali metal salt to a concentration of between about 15 to about 30 per cent SiO$_2$ and then contacting the sol with a porous solid ammonium ion-exchange material by flowing the sol thru a porous mass of material, thereby removing the remaining alkali metal salt, without coagulating said sol.

VANDERVEER VOORHEES.

REFERENCES CITED

The following references are of record in the file of this patent:

UNITED STATES PATENTS

| Number | Name | Date |
|---|---|---|
| 2,229,353 | Thomas | Jan. 21, 1941 |
| 2,244,325 | Bird | June 3, 1941 |
| 2,275,210 | Urbain | Mar. 3, 1942 |
| 2,283,172 | Bates | May 19, 1942 |
| 2,413,791 | Shafor | Jan. 7, 1947 |

OTHER REFERENCES

Synthetic Resins and Base Exchange Phenomena, Elving et al., Proceedings Indiana Acad. Science for 1941, published June 1942, page 143.

Preparation and Purification of Some Hydrous Oxide Sols, Ryznar Industrial and Engineering Chemistry, vol. 36, pages 821 and 822, September 1944.